United States Patent Office 3,500,091
Patented Mar. 10, 1970

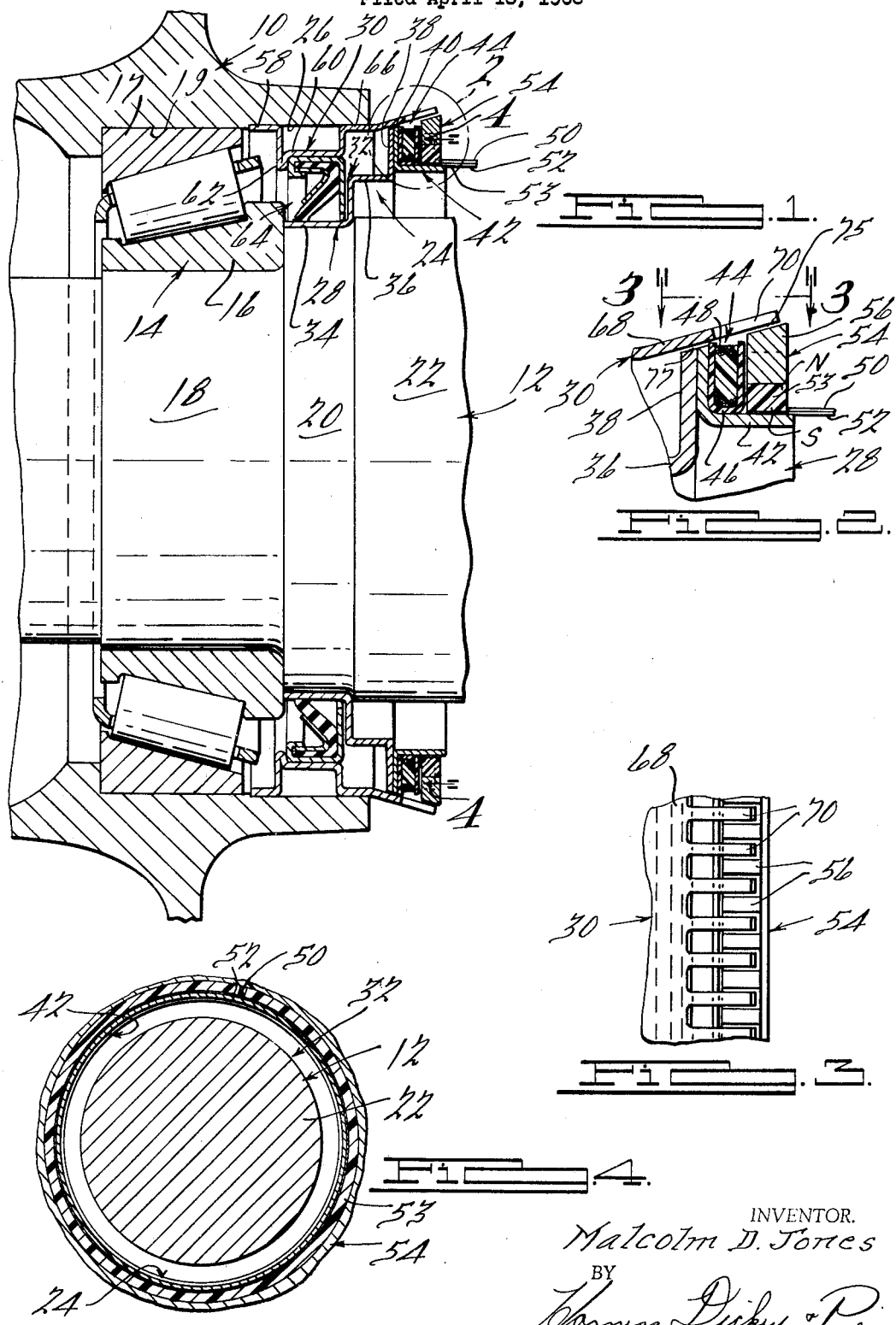

3,500,091
ELECTRICAL ROTATIONAL SPEED SENSING DEVICE
Malcolm D. Jones, Belleville, Mich., assignor to Kelsey-Hayes Company, Romulus, Mich., a corporation of Delaware
Filed Apr. 18, 1968, Ser. No. 722,230
Int. Cl. H02k *3/00, 19/26, 5/16*
U.S. Cl. 310—168                    9 Claims

ABSTRACT OF THE DISCLOSURE

A permanent magnet rotational speed sensing device for sensing the rotational speed of a member including rotor and stator members being of a toothed construction for providing a varying reluctance about a coil as the rotor and stator are relatively rotated whereby a speed signal is induced in the coil and such a device constructed in combination with a seal for mounting on the wheel of an automotive vehicle or the like.

---

The present invention relates to electrical, rotational speed sensors and more particularly to a speed sensor for sensing the rotational speed of a wheel of a vehicle.

It is desirable in many applications to provide an electrical signal which gives an indication of the wheel speed of a vehicle. This signal can be used, for example, in skid control apparatus such as that shown in the copending patent application of Every et al., Ser. No. 642,861, filed June 1, 1967, and the disclosure of that application is incorporated herein by reference. In the present invention, a novel speed sensing device is provided which device, while having other applications, can advantageously be employed in the skid control system. Therefore, it is an object of the present invention to provide a novel apparatus for electrically sensing the rotational speed of a wheel of a vehicle for use with a skid control system.

Features of the present invention can be utilized in rotational speed sensing other than vehicle wheels; therefore, it is another object of the present invention to provide a new and improved device for sensing rotational speed.

In the present invention, the speed sensor is of such a design that it can be advantageously combined with a seal for the wheel of a vehicle thereby providing for a novel combination of seal and wheel speed sensing device; therefore, it is another object of the present invention to provide a novel wheel speed sensing device and seal combination.

Other objects, features, and advantages of the present invention will become apparent from the subsequent description and the appended claims, taken in conjunction with the accompanying drawings, in which:

FIGURE 1 is a fragmentary view of a wheel and spindle assembly including the novel speed sensor of the present invention with some parts shown in section;

FIGURE 2 is a blown-up view of that part of the apparatus of FIGURE 1 included in the area 2;

FIGURE 3 is a view of the apparatus of FIGURE 2 taken along the line 3—3; and

FIGURE 4 is a sectional view to reduced scale taken generally along the line 4—4.

A wheel, only partially shown, having a hub 10 is shown to be mounted for rotation on a stationary spindle member 12; the hub 10 is supported on spindle 12 by a pair of bearing assemblies such as the rear bearing assembly 14. The bearing assembly 14 is of a tapered roller type and has an inner race 16 mounted upon a reduced diameter portion 18 of the spindle 12 which has successively larger diameter portions 20 and 22. The outer race 17 is located in a counterbore 19 in hub 10. A combination seal and rotational speed sensing assembly 24 is shown mounted between an enlarged counterbore 26 in the wheel hub 10 and the spindle portion 20.

The assembly 24 includes an annular stationary radially inner sensor retainer 28 and rotatable radially outer, annular seal retainer 30. The inner retainer 28 is of a stepped construction and has a first annular portion 32 with an axially outer step 34 being of a diameter to fit snugly, with an interference fit, onto the spindle portion 20 and with the succeeding, radially larger step 36 being in clearance relation with the spindle portion 22. The step 36 terminates in a radially extending flange 38 to which is fixed a similar radial flange 40 of an L-sectioned, annular support portion 42. A sensing or pick-up coil assembly 44 is supported on the L-shaped portion 42 and includes a U-sectioned bobbin 46 (FIGURE 2) upon which is wound a coil 48; the bobbin 46 is constructed of plastic or some other electrical insulator and is filled with epoxy to retain the coil 48 and to generally prevent movement of the individual turns. A pair of lead wires 50 and 52 from coil 48 can be connected to appropriate apparatus for utilizing the output signal from coil 48.

An annular, permanent magnet member 53 is mounted on the L-shaped portion 42 proximate to the coil assembly 44. The magnet 53 extends substantially for 360° and has its magnetic north and south poles at radially opposite sides of the ring as marked on the drawing (FIGURE 2). The magnet 53 can be of a flexible, plastic construction which is impregnated with barium ferrite particles which are magnetized. Magnet 53 can originally be in a straight strip form prior to assembly into an annular shape onto the L-shaped portion 42. The use of a continuous, i.e. around 360°, magnet, maximizes the available magnetic field strength for a given magnet material and, in the specific application shown, provides an output signal of a substantially high amplitude (1 volt at 33 r.p.m. with the diameter of magnet 53 being 5.25″). The high amplitude output is especially useful for skid control systems of the type shown in the copending application of Peter Every. Note, however, that the magnet need not be in one piece since a number of segments could also function properly.

An annular pole piece 54 is mounted concentrically on the magnet 53 proximate to the coil assembly 44 and has a plurality of uniformly, circumferentially disposed, radially outwardly extending teeth 56 which define a plurality of north poles. Note that the pole piece 54 extends for 360° and provides for good distribution of magnetic flux which also contributes to the good performance of the sensor; with the pole piece 54 extending for 360° a magnet covering around 180° could be used and a magnetic structure of around 360° would still be had, i.e. via pole piece 54; however, for maximum results the 360° magnet is preferred.

The outer seal retainer 30 is also of a stepped construction and has an annular, axially extending flange portion 58 which is matably located in counterbore 26 in hub 10 to hold retainer 30 therein. A radially inwardly extending step 60 is located to be radially aligned with outer step 34 of sensor retainer 28 and has a shoulder 62 at its axially outer end extending radially inwardly beyond the step 60. The step 60 and shoulder 62 matably receive an annular bearing seal assembly 64 which can be of a construction known in the art and sealingly engageable with step 34 whereby an effective seal for the lubricant for bearing assembly 14 is provided. A step 66 is also (like flange 58) matably received in counterbore 26 and aids in holding the seal retainer member 30 to the hub 10. A flange portion 68 extends generally axially (and tapers radially outwardly) from step 66 (FIGURE 2) and terminates in a plurality of generally uniformly circumferentially distributed fingers 70 which are generally concentric and in close clearance relation with the teeth 56 of the pole piece 54. The width of fingers 70 is less than the gap between teeth 56 and the number of fingers 70 and teeth 56 is the same (in the previous example 120 teeth and fingers were utilized). By using narrow fingers 70 and/or teeth 56 and wide gaps (in the confronting member) a high voltage output can be provided. However, if the gaps are too wide relative to the width of the finger 70 and/or teeth 56 a poor wave shape, i.e., non-sinusoidal, results; by narrowing the gaps the wave shape improves while the magnitude of the voltage decreases. It has been found that a good combination between output potential and sinusoidal wave shape is obtained if the fingers 70 are two-thirds the width of the gap between teeth 56 (or vice versa). Thus in relative rotation between retainers 28 and 30 the maximum change in reluctance is provided between the condition of maximum reluctance when the fingers 70 are in line with the gaps between teeth 56 and minimum reluctance when the fingers 70 and teeth 56 are radially aligned. Since the fingers 70 and teeth 56 are in the magnetic path for the magnet 53, which path encircles the coil 48, this maximum change in reluctance provides the maximum change in flux density around the coil 48 thereby maximizing its electrical output. The number of teeth 56 and fingers 70 will multiply directly the output frequency which will vary with wheel speed. The large number of poles or teeth 56 provide the advantageous frequency multiplication; with the skid control system of Every et al. between 120 and 240 teeth 56 are desirable. For other applications at least more than around 20 teeth 56 are preferred.

The result is an inexpensive sensor construction having a high output potential and a sensor and bearing seal combination which is ideally suited for sensing wheel speed of an automotive vehicle; however, the features of the present invention are applicable to other rotational speed sensing applications.

Note that it is believed that the use of a large amount of magnet material, i.e., around 360° in the particular case shown, plus the substantial changes in reluctance provided by the large numbers of teeth and fingers and the relative dimensioning of the associated, co-operating gaps helps provide for the high output characteristics discussed. The wheel bearing 14 is accurately dimensionally assembled in counterbore 19 of hub 10 and on the portion 18 of spindle 12; the dimensional tolerances of the adjacent portions of hub 10 and spindle 12 are also closely held as a part of the accuracy of the portions associated with wheel bearing 14. Thus by mounting the sensors apparatus axially and radially proximate the wheel bearing 14 on surfaces associated with the dimensionally accurate bearing mounting surfaces, a close tolerance assembly can be provided. This results in a predictable minimum run-out. Thus the air gaps 75 and 77 between the seal retainer 30 and sensor retainer 28 can be held to a minimum such that when teeth 56 and fingers 70 are radially aligned a minimum reluctance path is provided for magnet 53 around coil 48; this also aids in providing for the high output characteristics of the sensor apparatus since maximum flux density can then be obtained under the aligned tooth-finger condition. The above relationship can be applied to spindle portions on axles as well as front wheel spindles, such as steering knuckles, etc.

There are many ways in which the features of the present invention could be employed by one skilled in the art in view of the present disclosure; for example, in some applications it would be possible to make the fingers 70 and/or teeth 54 integral with one and/or the other of the hub 10 and spindle 12.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A rotational speed sensing device comrising a pair of members adapted to be rotated relatively to each other, magnet means mounted on one of said members for providing a magnetic field, means on at least one of said members for providing a varying reluctance path for said magnetic field as said members are relatively rotated, coil means located in said magnetic field for providing an electrical output in accordance with variations in the reluctance of said path, said magnet means comprising a magnetic structure extending generally at least partially circumferentially relative to the axis of relative rotation of said pair of members, each of said members having toothed portions thereon and in said path with each of said toothed portions having a plurality of generally at least partially circumferentially disposed teeth, said teeth on one of said toothed portions located in close tolerance relation to said teeth on the other of said toothed portions, one of said members being stationary, said coil means comprising a coil extending radially about a portion of the stationary one of said members, said magnetic structure including a magnet located on said stationary one of said members, said toothed portions of said stationary one of said members being defined by a pole member located concentrically with said magnet.

2. The device of claim 1 with said pair of members defining an annular cavity, and further comprising an annular seal located in said cavity.

3. A speed sensing device for sensing the rotational speed between a spindle and a related member of a wheeled vehicle with an anti-friction bearing located between and relatively rotatably supporting the spindle and related member, said device comprising a first annular member supported on the related member, a second annular member supported on the spindle, sensing means at least partially on one of said first and second members for providing an electrical output signal varying in magnitude in accordance with the relative rotational speed between the related member and spindle, and seal means for providing a lubrication seal for the bearing supported on at least one of said first and second members and located axially between said sensing means and the bearing.

4. The apparatus of claim 3 with said first member having radially aligned stepped portions defining a cavity for receiving said seal means.

5. The apparatus of claim 3 with said sensing means comprising magnet means mounted on one of said first and second members for providing a magnetic field, means for providing a varying reluctance path for said field as said related member and spindle are relatively rotated, coil means located in said magnetic field for providing the electrical output in accordance with variations in the reluctance of said path, said magnet means comprising a ring-shaped magnetic structure extending generally for 360°.

6. The device of claim 5 with each of said first and second members having toothed portions thereon and in said path with each of said toothed portions having a plurality of circumferentially disposed teeth, said teeth on one of said toothed portions located in close clearance relation to said teeth on the other of said toothed portions, said members located radially and axially proximate to said bearing whereby said close clearance can be held at a minimum providing minimum reluctance across said clearance.

7. A speed sensing device for sensing the rotational speed between a spindle and a related member of a wheeled vehicle with a bearing located between and relatively rotatably supporting the spindle and related member, said device comprising a first annular member supported on the related member, a second annular member supported on the spindle, sensing means on at least one of said first and second members for providing an electrical output signal varying in magnitude in accordance with the relative rotational speed between the related member and spindle, said sensing means comprising magnet means mounted on one of said first and second members for providing a magnetic field, means on at least one of said members for providing a varying reluctance path for said field as said first and second members are relatively rotated, coil means located in said magnetic field for providing the electrical output in accordance with variations in the reluctance of said path, said magnet means comprising a magnetic structure extending over a substantial portion of the circumference of said one of said members, said members located radially and axially proximate to said bearing whereby a close clearance relation between said members can be maintained providing for minimum reluctance across said clearance.

8. The device of claim 7 with said first and second members supported on locating surfaces proximate to and dimensionally related to the bearing support surfaces whereby a close tolerance between the locating and support surfaces can be readily maintained.

9. The device of claim 7 with each of said first and second members having toothed portions thereon and in said path with each of said toothed portions having a plurality of circumferentially disposed teeth, said teeth on one of said toothed portions located in said close clearance relative to said teeth on the other of said toothed portions.

References Cited

UNITED STATES PATENTS

| | | | |
|---|---|---|---|
| 427,294 | 5/1890 | Brace | 310—168 |
| 529,918 | 11/1894 | Kelly | 310—168 |
| 2,516,380 | 7/1950 | Goldschmidt | 310—155 |
| 2,692,956 | 10/1954 | Kaczor | 310—168 |
| 2,824,245 | 2/1958 | Trevitt | 310—168 |
| 3,218,494 | 11/1965 | Bacon | 310—168 |

MILTON O. HIRSHFIELD, Primary Examiner

R. SKUDY, Assistant Examiner

U.S. Cl. X.R.

310—66, 88, 90, 181